Figure 1:
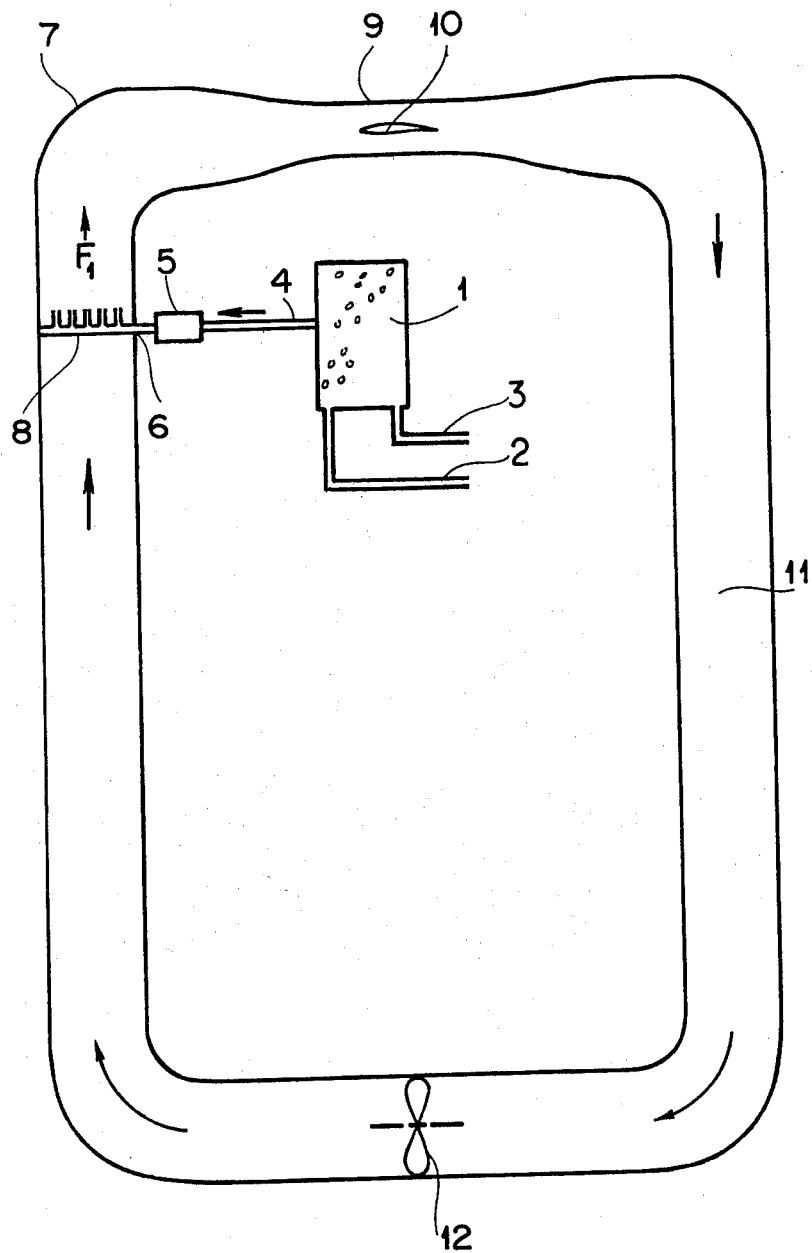

United States Patent [19]
Lecoffre

[11] 4,084,432
[45] Apr. 18, 1978

[54] METHOD OF SIMULATING CAVITATION BY HYDRAULIC TESTING

[75] Inventor: Yves Lecoffre, Echirolles, France

[73] Assignee: Societe Generale de Constructions Electriques et Mecaniques Alsthom S.A., Paris, France

[21] Appl. No.: 762,595

[22] Filed: Jan. 26, 1977

[30] Foreign Application Priority Data

Feb. 10, 1976  France .................. 76 03616

[51] Int. Cl.² ............................... G01M 10/00
[52] U.S. Cl. ............................... 73/148; 73/86
[58] Field of Search ............... 73/148, 432 SD, 86

[56] References Cited
U.S. PATENT DOCUMENTS 2,514,080  7/1950  Mason .................... 73/86

FOREIGN PATENT DOCUMENTS 188,731  12/1966  U.S.S.R. ................ 73/86
238,206  7/1969  U.S.S.R. ................ 73/148

*Primary Examiner*—Donald O. Woodiel
*Attorney, Agent, or Firm*—Sughrue, Rothwell, Mion, Zinn and Macpeak

[57] ABSTRACT

A method for simulating cavitation on models by hydraulic testing with separate micro-bubbles which produce effects similar to those of a prototype operating at the same cavitation number wherein the micro-bubble content of the test liquid around at least a predetermined part of the model is adjustable in number per unit volume and the bubbles are homogeneously distributed thereabout and have dimensions of less than 200 microns.

2 Claims, 4 Drawing Figures

METHOD OF SIMULATING CAVITATION BY HYDRAULIC TESTING

The present invention relates to a method of simulating cavitation by hydraulic testing.

The present invention provides a method for simulating cavitation on models by hydraulic testing with separate micro-bubbles which produce effects similar to those of a prototype operating at the same cavitation number wherein the micro-bubble content of the test liquid around at least a predetermined part of the model is adjustable in number per unit volume and the bubbles are homogeneously distributed thereabout and have dimensions of less than 200 microns.

The micro-bubbles are produced in a known way by expansion of a gas rich liquid which is injected in the test circuit fluid upstream of the model by means of a distributor manifold which is provided at the injection point making it possible to obtain a fluid in which the micro-bubbles are homogeneously distributed at the model.

The distance along the micro-bubble production means between the actual production zone of micro-bubbles and the injection point into the test liquid should be sufficiently small to prevent large bubbles from forming by degassing along the distance; in particular, the micro-bubble production zone could merge with the injection point.

According to the invention, the number of bubbles per unit volume may be adjusted by varying either the quantity of gas dissolved in the liquid of the micro-bubble production means (before the expansion which produces these micro-bubbles) or it may be adjusted by varying a throttle which enables the liquid flow rate to be varied upstream from the distributor manifold towards the micro-bubble production means.

The diameter of the micro-bubbles varies along their path according to the quantity of gas dissolved in the test liquid and according to the pressure variations which they undergo in this liquid.

The micro-bubble injection point in the test liquid will be chosen such that the bubbles do not disappear completely by gaseous diffusion before they reach the test zone and that their size, which varies under the combined effects of the gaseous diffusion and of the pressure, remains less than 200 microns in the test zone.

To meet these requirements, which depend on the geometrical configuration of the test circuit, the pressures and the speeds prevailing therein and the quantity of gas dissolved in the liquid of said test circuit, the optimum distance between the injection point and the test zone can be evaluated and may have a value lying between a few tens of centimeters and several meters.

This distance will be calculated for each particular case, applying the formula:

$$dmi/dt = Kli \ 4\pi \ R^2 \ Hi \ (Prefi - Pi)$$

giving as a function of time $t$ the loss of mass $mi$ of the gas $i$ constituting one of the components (or the only component) of the bubble as a function of:

$Kli$ The liquid film coefficient at the wall of the bubble for the gas in question;
$R$ The radius of the bubble;
$Hi$ Henry's constant for the gas in question and the liquid contained in the test circuit;
$Prefi$ The ratio $Ci/Hi$ of the concentration $Ci$ in the liquid of the gas $i$ to Henry's constant; and
$Pi$ The partial pressure of the gas $i$ in the bubble.

This formula makes it possible to determine the evolution of the radius (R) of each bubble in the test circuit.

It is thus possible to determine the optimum injection zone for providing a population of micro-bubbles at the test zone having a size of less than 200 microns and which are adjustable in number.

Figure 2:
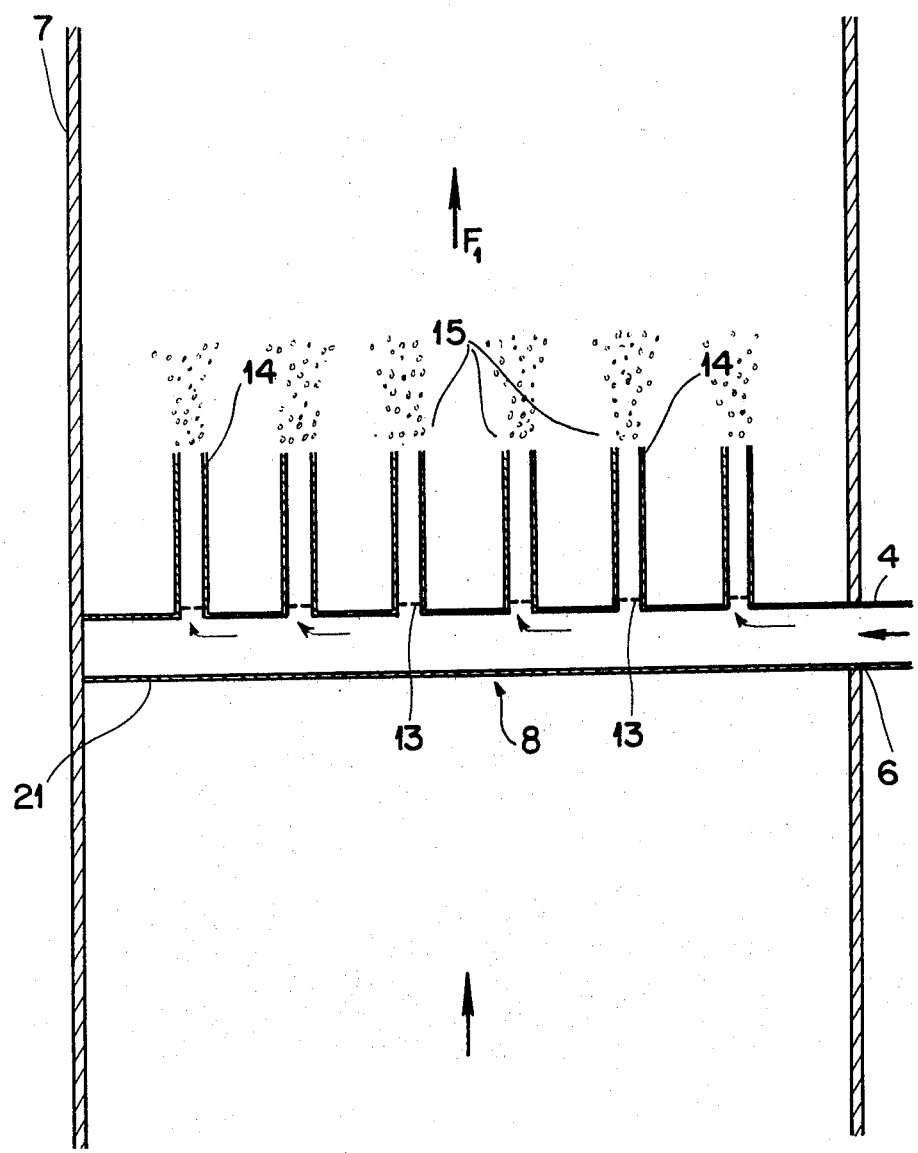
Figure 3:
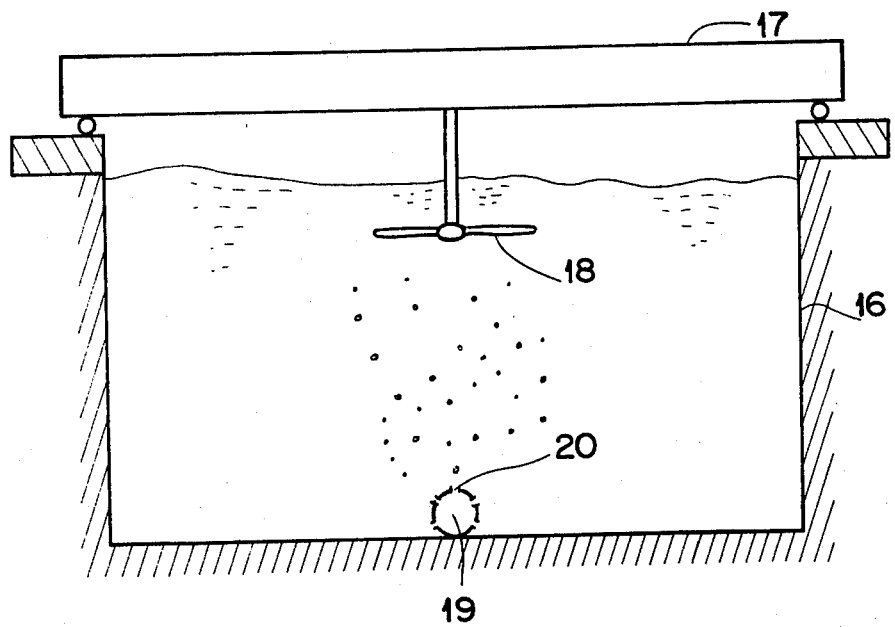
Figure 4:
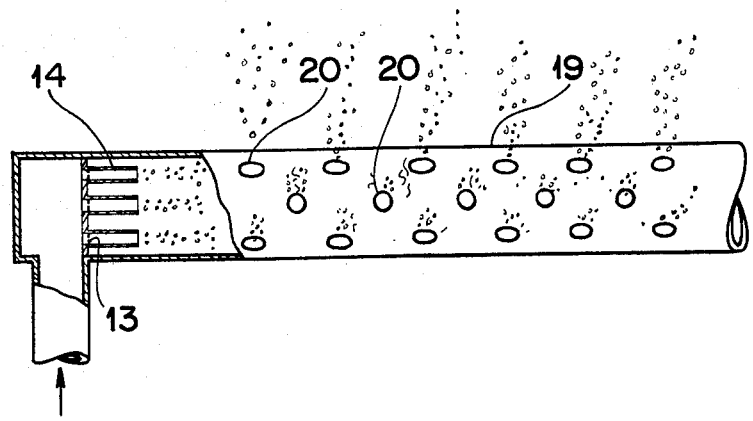

Examples of the invention are described hereinbelow with reference to the accompanying drawings; in which:

FIG. 1 is a schematic view of a hydraulic test circuit;
FIG. 2 is a detail view of a particular micro-bubble injection device;
FIG. 3 is a schematic view of a test tank; and
FIG. 4 is a detail view of the injection device of the test tank of FIG. 3.

FIG. 1 shows an embodiment of a hydraulic test circuit 7 for performing the invention, comprising a reservoir 1 enabling the water of the micro-bubble production circuit to be charged with gas. Pressurized water 2 and air 3 are supplied to the reservoir 1, where they are mixed to obtain a liquid rich in dissolved air at an outlet 4.

This liquid is caused to expand at 5 and hence micro-bubbles are formed. This liquid very rich in micro-bubbles is then introduced into the test circuit 7 at 6 by means of a distributor manifold 8 from which it is injected into the liquid of the test circuit 7.

The bubbles thus distributed are carried along in the test circuit 7 in the direction of an arrow F1 towards a cavitation test zone 9, which contains a model 10.

The size and number of the bubbles will be adjusted either by varying the quantity of gas dissolved in the reservoir 1 or by partially constricting the bubble production circuit by means of a throttle placed in this circuit either between the outlet 4 and the expansion at 5 or between the expansion at 8 and the point 6 of introduction into the test circuit 7.

Downstream from the test zone reabsorption takes place in a reabsorption 11 of the test circuit, making it possible for the bubbles to disappear before the liquid reaches the injection zone 6 again. A pump 12 ensures the circulation of the liquid in the direction of the arrow F1 in the test circuit 7.

The distance between the micro-bubble production zone 5 and the injection zone 6 is as short as possible. In particular embodiments they can be merged.

The distance between the point of introduction 6 and the test zone 9 will have been calculated previously according to the formula:

$$dmi/dt = Kli \ 4\pi \ R^2 \ Hi \ (Prefi - Pi)$$

given in the preamble.

For example, with only one gas and the following characteristics:

$Kli = 1.5 \ 10^{-4}$ m/s
$Hi = 0.5 \ 10^{-6}$ kg/m$^3$/Pa
$Prefi = 0$
$Pi = 10^5$ Pa
Initial $R = 10^{-4}$ m and neglecting the effects of surface tension, we have:
$dR/dt = (1/1.3) \ 1.5 \ 10^{-4} \ 0.5 \ 10^{-6} \ 10^{-5}$
$dR/dt = 0.58.10^{-5}$ m/s This leads to a disappearance time $td$ of 20 seconds for a bubble with an initial radius of 100 microns.

With a flow speed V of 1 m/s at a constant pressure, the distance $l$ between the injection point 6 and the test zone 9 should be less than:

$l = V \cdot td$ e.g. in this case:

$l = 1 \times 20 = 20$ m

FIG. 2 is a particular embodiment of a bubble distributor manifold 8, in which the expansion producing the bubbles and their injection and distribution occur simultaneously at the point 6 of introduction into the test circuit 7.

The injection distributor manifold 21 includes small diaphragms 13 whose diameter lies between 2/10ths and 2 mm producing a cavitating expansion.

These diaphragms are followed by small tubes 14 with a diameter lying between 2 and about 10 times that of the diaphragm, the micro-bubbles forming in the zone 15 immediately downstream from the expansion distributor manifold.

The length of the tubes 14 is in the order of a hundred times the diameter of th diaphragms 13.

FIG. 3 is an embodiment of the invention in the case of hydraulic tests in a test tank in which the model is moved.

In this case, it is necessary for the form of the injection flow to be properly distributed at the base of the test tank.

This FIG. 3 shows a test tank 16 filled with liquid and having a carriage 17 above it which can move along the test tank propelling the test model 18.

A pipe 19 pierced with orifices 20 extends along the whole length of the test tank 16 and shown in detail in FIG. 4 and is installed at the bottom of the test tank 16.

FIG. 4 also shows this pipe 19 with its orifices 20 and the expansion unit forming the micro-bubbles constituted by diaphragms 13 followed by tubes 14. The micro-bubbles formed by the tubes 14 are emitted along the whole test tank 16 by the orifices 20 in the pipe 19, ensuring properly distributed injection all along the bottom of the test tank.

The length of the path of the bubbles in the test tank before reaching the model 18 is given by the height between the pipe and the model and this distance will be determined in the same way as in the example of FIG. 1, in order to obtain micro-bubbles with the required dimensions at the model, the speed accounted for then being the rising speed of the bubbles.

What I claim is:

1. A method for simulating cavitation on models including the step of introducing micro-bubbles into a test liquid stream upstream of an immersed model which produce effects similar to those of a prototype operating at the same cavitation number, the improvement comprising the step of varying the distance between the point of injection of the bubbles into the test liquid and the model downstream thereof as a function of the quantity of gas dissolved in the test liquid, the kind of gas, the kind of test liquid, rate of flow of the test liquid and pressure of the test liquid, to insure homogeney of bubbles in the test zone and to prevent the bubbles from disappearing completely by gaseous diffusion prior to reaching the test zone and from exceeding 200 microns in size at said test zone.

2. The method according to claim 1, wherein said distance is varied in accordance with the formula:

$$dmi/dt = Kli\, 4\pi\, R^2\, Hi\, (Prefi - Pi)$$

wherein $dmi/dt$ is the loss of mass $mi$ of the gas $i$ as function of time $t$, $Kli$ is the liquid film coefficient at the wall of the bubble for the gas in question, $R$ is the radius of the bubble, $Hi$ is the Henry's constant for the gas in question and the liquid contained in the test circuit, $Prefi$ is the ratio $Ci/Hi$ of the concentration $Ci$ in the liquid of the gas $i$ to Henry's constant; and $Pi$ is the partial pressure of the gas $i$ in the bubble.

* * * * *